No. 694,821. Patented Mar. 4, 1902.
A. VON BEUST & F. M. POTTER.
TIRE.
(Application filed July 27, 1901.)
(No Model.)

Witnesses:
C. J. Kesler
Dennis Sumby

Inventors
Anton von Beust
Frank M. Potter
By James L. Norris
Atty.

THE NORRIS PETERS CO., PHOTO-LITHO., WASHINGTON, D. C.

UNITED STATES PATENT OFFICE.

ANTON VON BEUST, OF ORANGE, AND FRANK M. POTTER, OF NEWARK, NEW JERSEY.

TIRE.

SPECIFICATION forming part of Letters Patent No. 694,821, dated March 4, 1902.

Application filed July 27, 1901. Serial No. 69,964. (No model.)

*To all whom it may concern:*

Be it known that we, ANTON VON BEUST, residing at Orange, and FRANK M. POTTER, residing at Newark, in the county of Essex and State of New Jersey, citizens of the United States, have invented new and useful Improvements in Tires, of which the following is a specification.

Our invention relates to improvements in that character of tire intended as a substitute for the ordinary pneumatic tire, comprising an outer casing provided with a suitable resilient filling material, whereby the tire is given the necessary cushioning properties without at the same time being rendered liable to accident by puncture, as in the case of a tire inflated with air.

The object of our invention is to provide an improved construction of filling or core for the outer casing, whereby the tire as a whole shall be light and durable and possessed of a degree of resiliency approaching that of a pneumatic tire.

With this object in view the invention resides in the features of construction and the combination and arrangement of parts, as hereinafter described, and particularly set forth in the claims.

In order that our invention may be clearly understood, we have illustrated the same in the accompanying drawings, wherein—

Figure 1:
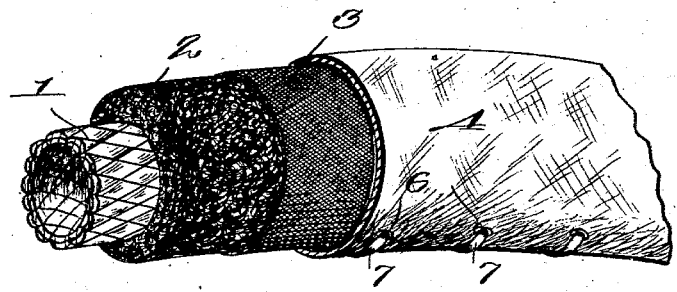
Figure 2:
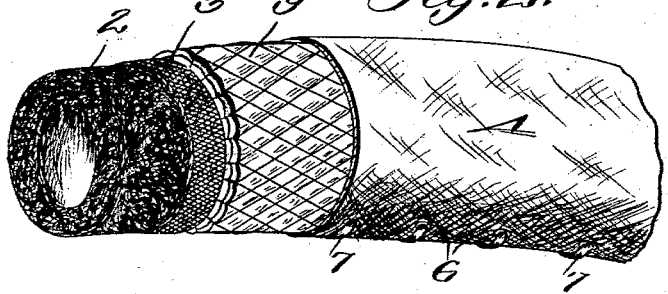
Figure 3:
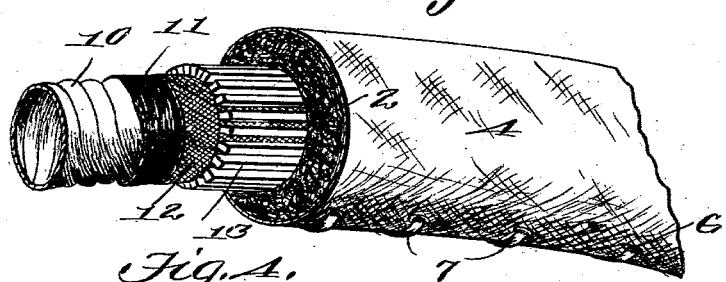
Figure 4:
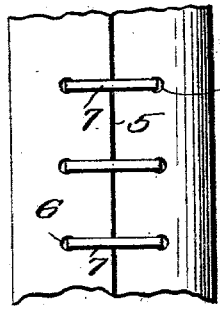
Figure 5:

Figure 1 is a perspective view of a portion of a tire constructed according to our invention, showing at one end the arrangement of the various layers composing the tire. Fig. 2 is a view similar to Fig. 1, showing a modified arrangement. Fig. 3 is a like view illustrating a further modified arrangement. Fig. 4 is a view of a portion of the inner or rim side of the tire, showing the means for securing the meeting edges thereof; and Fig. 5 is a detail view of one of the clamps.

Referring now to the drawings, 1 indicates an inner tube made of braided cane or bamboo and of a length to extend throughout the length of the tire. Over this cane or bamboo tube a relatively thick strip of sponge-rubber 2 is next wound spirally, so that the edges shall abut, and the layer of sponge-rubber thus provided is wound about with cloth 3. The ends of the compound tube thus provided are next brought together and secured by means of vulcanization, whereby to form an annulus. Said annulus is next incased in an outer tube 4, of canvas and rubber, and the tire is complete. In order to secure the casing 4 about the core, an ordinary outer casing in the form of an annulus is slit on its rim side throughout its length, as indicated at 5, and provided adjacent to its edges with corresponding holes 6. Said casing is now placed on the annular core described and secured thereon by means of curved clamps 7, having inclined prongs 8, which prongs are inserted in corresponding openings 6.

In Fig. 2 we have shown a different arrangement of the layers constituting the core. In this modification the layer 2 of sponge-rubber covered with cloth 3, as previously described, is incased in a tube 9, made of braided bamboo or cane. The core is then made into an annulus, as before described, and incased in the outer tube 4.

The cane or bamboo tube 1 9 of Figs. 1 and 2 is intended to give the necessary strength to the tire to enable it to withstand the crushing strain to which it is subjected in use. At the same time these tubes are very flexible and will not impair to an objectionable extent the resiliency of the tire afforded by the sponge-rubber.

In cases where the tire is to be used on vehicles heavier than the ordinary bicycle a stronger construction of tire, such as shown in Fig. 3, may be employed. In this construction a strip of cane or bamboo is wound spirally to form an inner resistance-tube 10. Said tube is then wound or otherwise covered with cloth 11, which is glued to the tube, and the cloth in turn is covered with a thin layer of rubber 12, which is preferably accomplished by winding a thin strip of rubber spirally around the cloth-covered tube 10. A number of strips 13 of cane or bamboo are next placed around the covered tube 10 at suitable intervals apart and extending longitudinally of the tube from end to end thereof. These longitudinal strips are next wound with the thick strip of sponge-rubber 2, which is wound with cloth 3, as before described. The core as thus formed is made into an annulus and incased in the outer tube 4.

A tire constructed according to our invention will combine strength and durability with a power of resiliency sufficient to afford the desired cushioning effect in riding.

We do not wish to be understood as limiting ourselves to the use of cane or bamboo in the connections described, but may in certain cases employ metal in lieu of cane or bamboo or any other substance found desirable and suitable.

Having thus fully described our invention, what we claim as new is—

1. A tire for vehicles comprising an outer casing inclosing a core consisting of a non-resilient elastic tube and a tubular layer of sponge-rubber.

2. A tire for vehicles consisting of an outer casing inclosing a core comprising a layer of sponge-rubber and an elastic tube of cane.

3. A tire for vehicles consisting of an outer casing inclosing a core comprising a tubular layer of sponge-rubber and a tubular layer of cane, bamboo, or equivalent material.

4. A tire for vehicles consisting of an outer casing inclosing a core comprising a tubular layer of sponge-rubber and a tubular layer of woven cane or bamboo.

5. A tire for vehicles consisting of an outer casing inclosing a core comprising a central non-resilient tube and an outer layer of sponge-rubber.

6. A tire for vehicles consisting of an outer casing inclosing a core comprising a central non-resilient tube, a series of strips of non-resilient material extending longitudinally of the tube, and a layer of a resilient substance.

7. A tire for vehicles consisting of an outer casing inclosing a core comprising a central tube of cane surrounded by a layer of rubber, a series of longitudinally-extending strips of cane surrounding said rubber-covered tube and a layer of sponge-rubber surrounding said strips.

In testimony whereof we have hereunto set our hands in presence of two subscribing witnesses.

ANTON VON BEUST.
FRANK M. POTTER.

Witnesses:
DANIEL A. DUGAN,
CORNELIA A. BARNARD.